United States Patent [19]

Kracke

[11] Patent Number: 5,370,487
[45] Date of Patent: Dec. 6, 1994

[54] TACK WITH A SLIT

[76] Inventor: David R. Kracke, 2155 NE. 79th Ave., Portland, Oreg. 97213

[21] Appl. No.: 62,247

[22] Filed: May 17, 1993

[51] Int. Cl.[5] .......................... F16B 15/02; A47G 1/10
[52] U.S. Cl. .................................. 411/485; 411/923; 248/316.7
[58] Field of Search ............... 411/483, 485, 531, 923; 248/313, 316.5, 316.7

[56] References Cited

U.S. PATENT DOCUMENTS

| | | | |
|---|---|---|---|
| 279,274 | 6/1883 | Patterson | 411/531 X |
| 1,970,335 | 8/1934 | Place | 411/485 |
| 2,283,766 | 5/1942 | Sbicca | 411/923 X |
| 3,386,328 | 6/1968 | Litfin | 411/923 X |

FOREIGN PATENT DOCUMENTS

| | | | |
|---|---|---|---|
| 259729 | 5/1913 | Germany | 411/483 |

*Primary Examiner*—Neill R. Wilson

[57] ABSTRACT

The present invention is a thumb tack for holding photographs, posters and other similar items firmly in place on a supporting surface without poking any holes in the item being hung. The tack consists of a conventional sharp pin projecting outwardly from the underside of a bottom plate on the tack head. The tack head consists of the bottom plate connected to the top head by an edge razor thereof so that a slit is defined between the bottom plate and the top of the tack head. The top portion of the head has a peripheral arcuate clamping edge extending around the razor portion of the periphery of the top portion of the tack head. This razor portion of the periphery of the top portion of the tack head creates a clamp-like slit between the bottom plate and the top portion of the tack head. This slit is dimensioned for receiving edges of photographs, posters or other similar items which can then be inserted into the slit and held firmly in place without the necessity of poking a hole in the item being hung. With the photograph, or similar item, inserted into the slit, the pin can be pressed into a wall or supporting surface to hold the photograph, or similar item to the supporting surface.

8 Claims, 1 Drawing Sheet

TACK WITH A SLIT

BACKGROUND OF THE INVENTION

1. Field of the Invention

The present invention is a tack that holds photographs, posters and other similar items firmly in place on a supporting surface without poking any holes in the photograph, poster, or other similar item iteself.

2. Prior Art

In order to hang a photograph, poster or similar items on a wall, bulletin board or other supporting surface using a conventional tack or push pin one must pierce the edge of the item sought to be hung causing a hole to be made in the item itself. After multiple hangings, the item can become torn and tattered around the area where the push pins have punctured it. The only other option is to "pinch" the poster, photograph or similar item between the tack edge and the supporting surface. This technique for hanging items is unreliable and often leads to the item coming loose and falling from its hanging place.

There is no device known that allows a photograph, poster or similar item to be held securely to a wall by a tack without poking holes in the item.

SUMMARY OF THE INVENTION

The principal object of the present invention is to hold photographs, posters, and the like to a wall or other supporting surface using a tack without puncturing the item with the sharp pin end of the tack.

It is also an object of the present invention to allow for the display of items typically secured by a conventional tack without damaging the item itself.

A further object of the invention is to allow an item secured to a wall by this tack to be easily removed without removing the tack itself. Just as easily, the item can be reinserted into the tack for rehanging without removal of the tack.

The foregoing objects can be accomplished by providing a tack that has a slit between the tack head and the pin projecting outwardly from the underside of a bottom plate. This slit becomes a clamp that through pressure around the tack head's circumference allows the photographs, posters, certificates and similar items to be inserted and secured within the clamp-like slit, and subsequently secured to the supporting surface by forcibly driving the pointed shank of the tack into the supporting surface.

DETAILED DESCRIPTION

Figure 1:
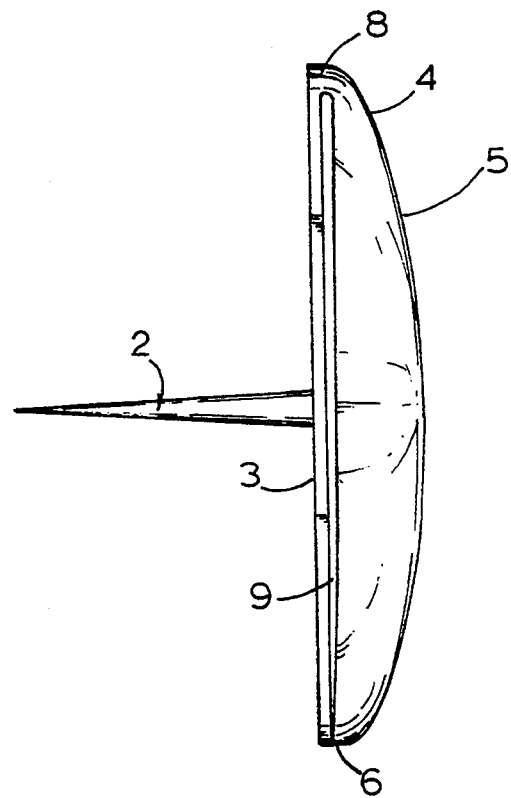
FIG. 1 is a side view of the tack with a slit in accordance with the present invention.
Figure 2:
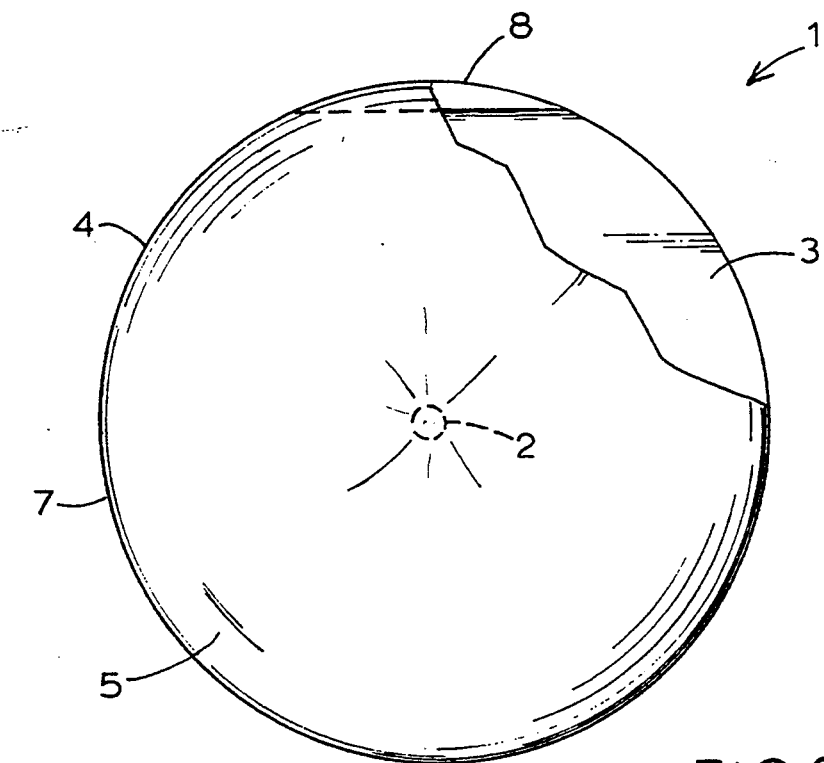
FIG. 2 is a top perspective of the tack with a slit, with the dotted lines representing the bottom plate and pin beneath the solid top plate.

With reference to FIGS. 1 and 2, which is an overall drawing of a preferred embodiment of the invention, a tack 1 of the present invention includes a conventional sharp pin 2 projecting outwardly from the underside of a bottom plate 3 of a relatively large round head 4. The diameter of the bottom plate 3 can vary in size, but for the sake of this description is approximately ½ inch. The head 4 further includes an arch-shaped round top surface 5 having a relatively sharp edge that extends downwardly toward the bottom plate to form a gripping edge that retains materials inserted between the top and bottom plates. The top 5 is connected to an upper surface of the plate 3 at a bridge of integral material that extends along a portion of the head 8 thereof so that a slit 9 is defined between the plate 3 and the top 5.

The slit 9 is dimensioned for receiving edges of posters, photographs, etc. For example, a poster (not shown) can be held to a wall by inserting the edge of the poster into the slit 9. By inserting the edge of the poster into the slit 9, the clamping edge 6 holds the poster firmly in place against the upper side of the plate 3. With the poster inserted into the slit 9, the pin 2 can be pressed into a wall or other supporting surface to hold the poster securely to the supporting surface. Similarly, the pin 2 can be pressed into a wall or supporting surface prior to having the poster inserted into the slit 9. The poster can then be inserted into the slit 9 thus securing it to the wall, or supporting surface.

The head 4 can be varied in shape to reflect that tack head style preferred by the user. For example, instead of the relatively large round head 4 indicated in the FIGS. 1 and 2, the tack head could be of a more cylindrical shape. The tack head could be shaped in a myriad of ways, just as there are a myriad of tack heads available today. They would all be similar, however, in that they would each include a clamping edge between the tack head and the base of the tack.

The tack With a slit secures posters, photographs, and similar items to walls and other supporting surfaces without damaging the photograph, poster or similar item itself. The tack with a slit allows items to be hung with a tack without puncturing the item. It also allows for the easy removal and re-insertion of posters, photographs, etc., from the tack with a slit once the pin portion of the tack with a slit is secured into the wall or supporting surface.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hanger for securing photographs, posters or other similar items to a supporting surface without poking a hole in the item to be hung comprising of an elongated shank tapering to a pointed end and having a head at the other end formed as a bottom plate connected to a top plate by a bridge strip of material extending along a portion of one edge of the head and wherein the top plate has a relatively sharp edge that extends downwardly toward the bottom plate to from a gripping edge, forming a slit that is dimensioned for receiving the edges of photographs, posters or similar items and securing the item between the bottom plate and the gripping edge of the top plate allowing the item to be held firmly between the bottom plate and the top plate and secured to a supporting surface by the pointed end of the hanger without poking a hole in the item that is being hung with the hanger.

2. A hanger for securing items to a surface comprising:

a head having a bottom structure and a top structure, the top structure having a clamping portion and a spring-like bridge linking the top structure to the bottom structure so as to urge the clamping portion of the top structure into close proximity with the bottom structure; and a shank having a first end and a second end, the first end being securely connected to the bottom structure and the second end being sufficiently pointed to allow penetration into the surface.

3. The hanger of claim 2 wherein the clamping portion of the top structure is an edge.

4. The hanger of claim 3 wherein the edge is relatively sharp.

5. The hanger of claim 3 wherein the edge is arcuate.

6. The hanger of claim 2 wherein the bottom structure is plate-shaped.

7. The hanger of claim 2 wherein the shank is substantially perpendicular to the bottom structure.

8. The hanger of claim 2 wherein the top and bottom structures define a slit in the head.

* * * * *